Feb. 21, 1967  J. W. ORENDORFF  3,304,895
EARTHWORKING APPARATUS
Filed Aug. 17, 1964  3 Sheets-Sheet 1
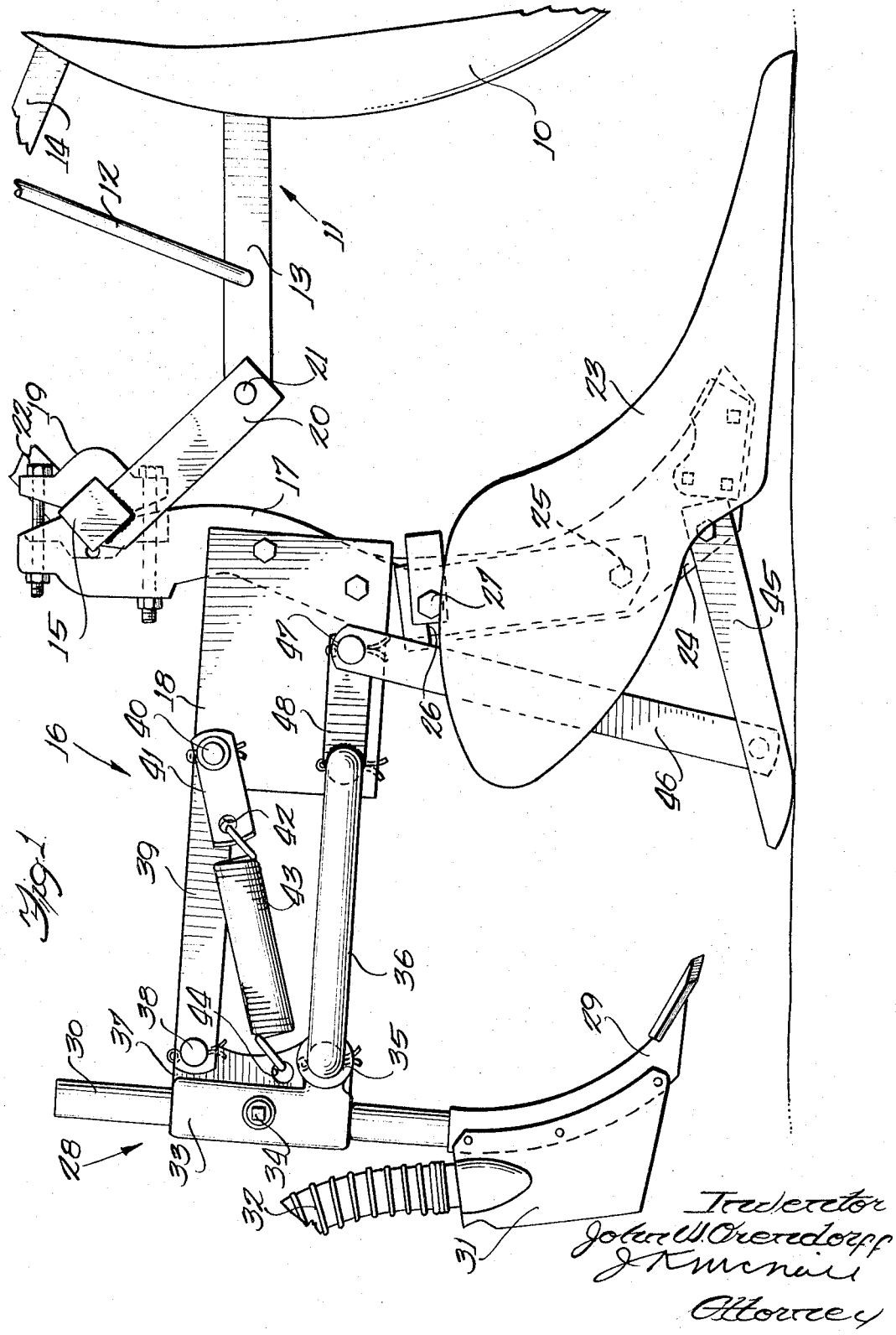

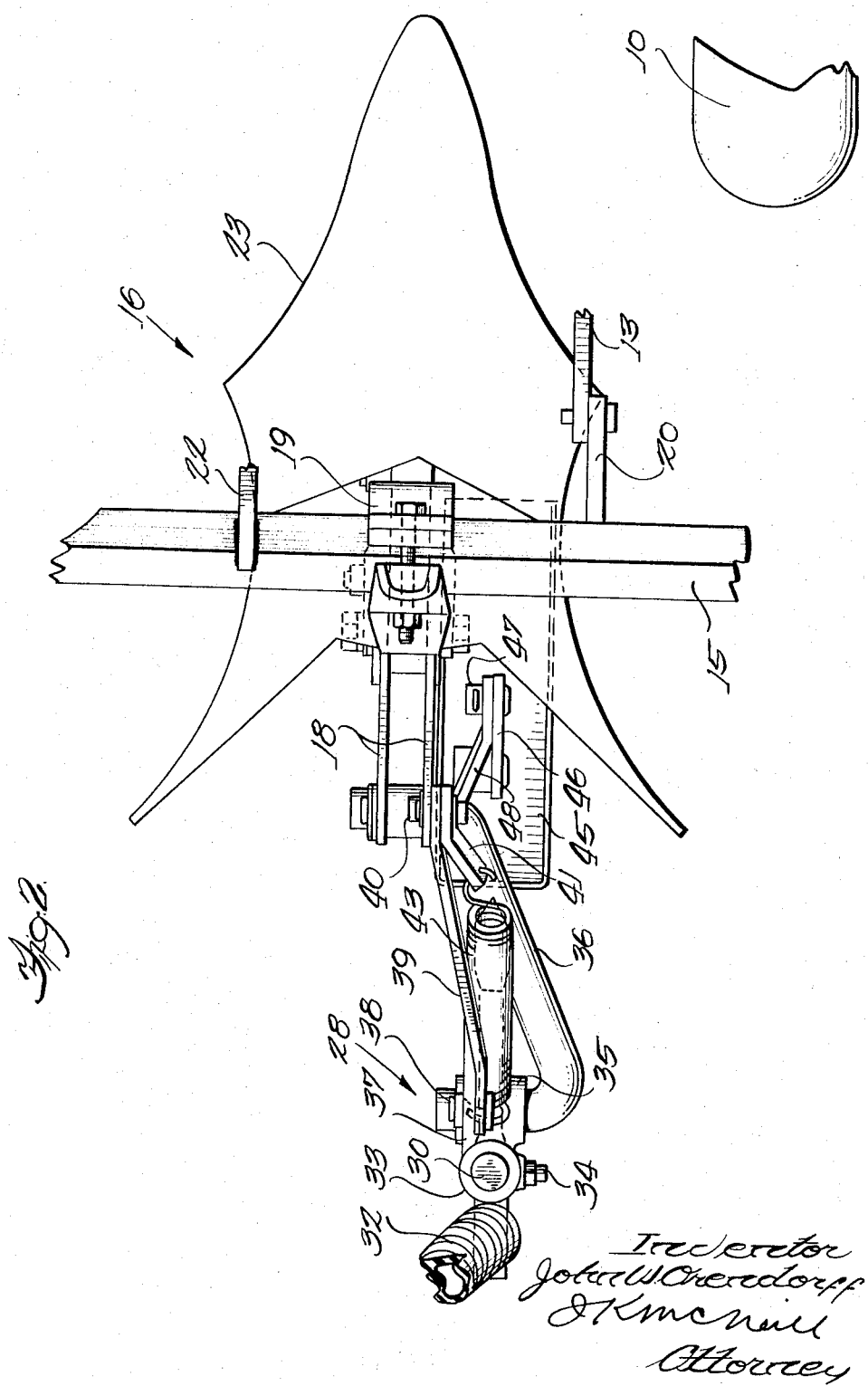

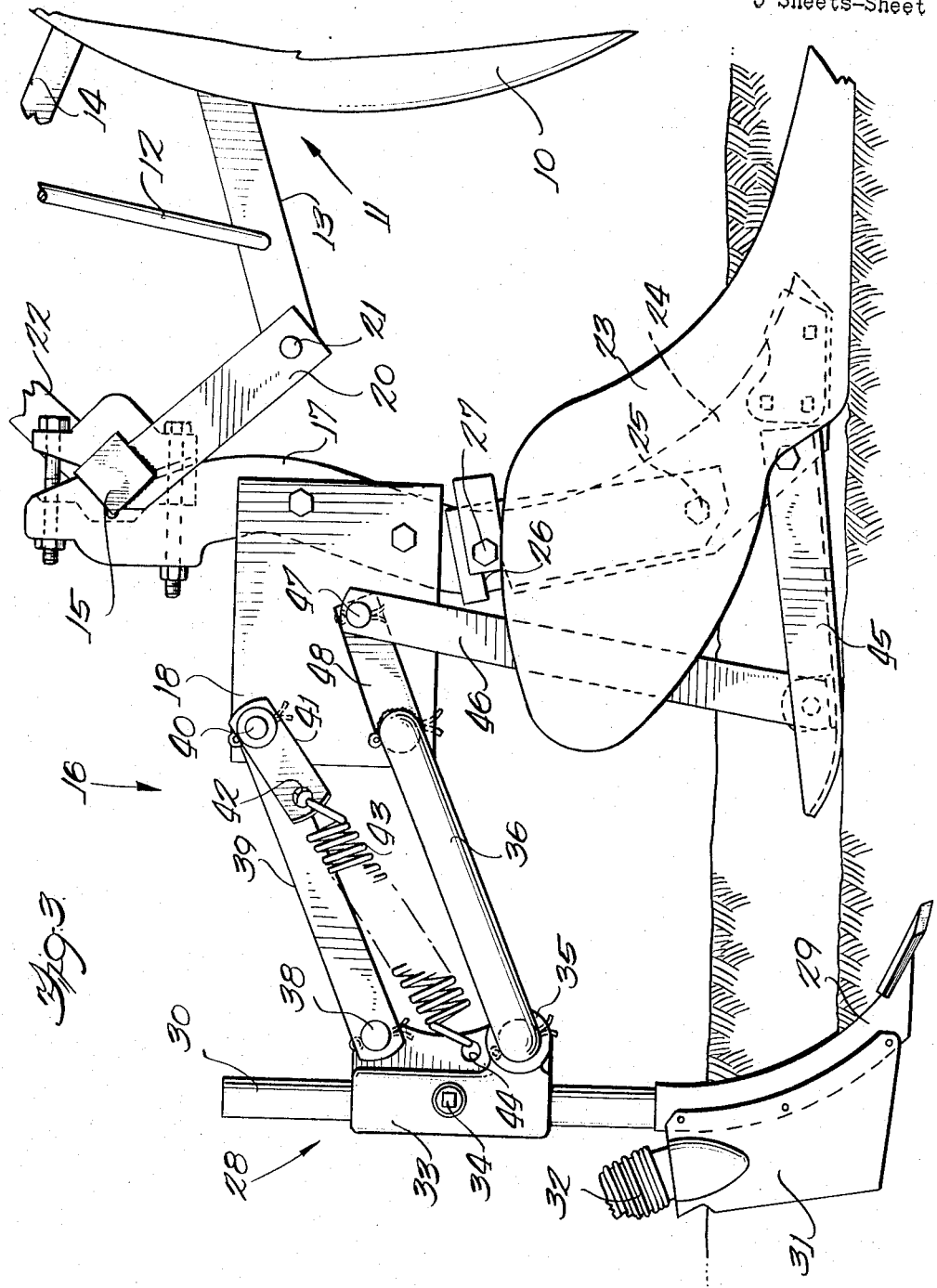

United States Patent Office 3,304,895
Patented Feb. 21, 1967

3,304,895
EARTHWORKING APPARATUS
John W. Orendorff, Downers Grove, Ill., assignor to International Harvester Company, Chicago, Ill., a corporation of New Jersey
Filed Aug. 17, 1964, Ser. No. 389,978
8 Claims. (Cl. 111—83)

This invention relates to agricultural implements and particularly to earthworking implements. More specifically the invention concerns an implement particularly adapted for operation in trash covered ground.

The implement described herein is of the type known as a lister planter, and the present invention concerns the addition to a conventional lister planter of an applicator for fertilizer adapted to penetrate at a lower depth than the lister bottom which generally forms the furrow in which the seed is planted.

It is considered desirable that fertilizer be deposited deeper than the seed, and this practice, when used in conjunction with a lister bottom, requires the fertilizer opener to operate in the subsoil below the lister bottom. In conventional equipment, the fertilizer opener is in fixed relation to the lister bottom, and when the implement is lowered to the ground from a raised, transport position, the fertilizer opening tool penetrates the ground first and collects surface trash which would normally be cleared by the lister bottom, the trash being trapped between the lister bottom and the fertilizer furrow opener and disturbing the seed furrow as the implement traverses the field.

To avoid the disadvantages inherent in conventional equipment, therefore, the present invention has for its object the provision of means designed to cause the lister bottom to enter the ground before the fertilizer furrow opening tool, thus clearing a path and preventing the collection of trash on the fertilizer opening tool.

Another object of the invention is the provision of an improved planter and fertilizer opener assembly wherein the fertilizer opening tool is raised higher than the seed opening tool when the implement is raised to transport position, and is retained in this position until the implement is lowered to the ground giving the seed furrow opener an opportunity to enter the ground before the fertilizer opener.

Another object of the invention is the provision, in an implement, of a furrow opening tool carried by a supporting frame adapted to be raised and lowered, wherein the tool is vertically movable relative to the frame and is biased upwardly relative thereto, means being provided operatively upon lowering the implement to urge the tool downwardly into its operating position.

Other objects and advantages of the invention will become clear from the following detailed description when read in conjunction with the accompanying drawings wherein:

FIGURE 1 is a view in side elevation of the rear end of a tractor having mounted thereon an implement incorporating the features of this invention and illustrating an intermediate position of the earthworking tools as they are lowered to their operating position;

FIGURE 2 is a plan view of a portion of the implement shown in FIGURE 1; and

FIGURE 3 is a view in side elevation similar to FIGURE 1 showing the earthworking tools in their operating position.

In the drawings the numeral 10 designates one of the rear wheels of a tractor having a vertically swingable hitch structure 11 operable by any well known power lifting apparatus deriving its power from the tractor, lifting being accomplished by lifting links 12, the hitch structure 11 preferably including a pair of lower links 13, to each of which is connected a lift link 12, and an upper compression link 14, only one of the lift links 12 and the lower links 13 being shown.

The structure shown in the drawings is a portion of a lister, and comprises a transversely extending tool bar 15 upon which may be mounted a plurality of earthworking units 16. Tool bar 15 comprises part of an implement supporting framework which may also include, for each unit, a generally vertically extending standard 17 having affixed thereto a pair of rectangular supporting plates 18, and secured at its upper end to the tool bar 15 by a clamp 19. A pair of laterally spaced depending members 20, only one of which is shown, are affixed, as by welding, to the tool bar 15 and are connected by pivot means 21 to the rear ends of hitch links 13, a central mast member 22 being secured to bar 15 and similarly pivotally connected, by means not shown, to upper hitch link 14, whereby vertical movement of the hitch structure 11 is utilized to raise the implement to its transport position above the ground and to lower it to its operating position.

Upon the lower end of standard 17 is mounted a lister plow bottom 23 which is secured, by means not shown, to plates 24, which straddle the standard and may form part of the implement supporting structure, and are mounted upon a pivot bolt 25 carried at the lower end of standard 17. The upper ends of plates 24 are provided with slots 26 in which are received bolts 27 carried by standard 17 to frictionally hold the bottom 23 against tripping under normal operating conditions, but allowing the plates 24 and bottom 23 carried thereby to trip about pivot 25 when abnormal draft forces are encountered.

It may be understood that seed may be sown in the furrow formed by the lister bottom 23, suitable seed depositing mechanism, not shown, being carried in any suitable manner by the supporting frame. Fertilizer is preferably deposited in the soil below the level of the seed, and a fertilizer unit designated 28 forms a part of the implement of this invention and includes a furrow opening tool 29 shown in FIGURE 3 in its normal operating position penetrating the subsoil below the level of the lister bottom.

The furrow opening tool 29 is secured to the lower end of a vertical spindle 30, and has secured thereto a boot 31 in which is received a flexible fertilizer tube 32 receiving fertilizer from a suitable container, also not shown, and supported in any well known manner upon the implement frame.

Spindle 30 is adjustably received in the sleeve portion of a bracket 33 carrying a set screw 34 by which the spindle 30 is held in position. Bracket 33 also includes a boss 35 in which is pivotally received the laterally bent rear end of a forwardly extending link 36, the forward end of which is likewise bent laterally for pivotal reception in suitable openings provided in plates 18. A web portion 37 of bracket 33 carries a pivot pin 38 upon which is mounted the rear end of an upper link 39, generally parallel to link 36 and having its forward end connected by a pivot pin 40 with one of the plates 18. Thus, the fertilizer opening assembly 28 and its earth-penetrating tool 29 are capable of vertical swinging movement in a generally straight line relative to the earthworking lister bottom 23. In order to normally bias the fertilizer assembly 28 upwardly relative to lister bottom 23, a strap 41 is mounted on pivot pin 40, and its other end has an opening 42 therein to anchor one end of an extension spring 43, the other end of which is anchored in an opening 44 provided in the web portion 37.

The action of spring 43 in elevating fertilizer assembly 28 allows lister bottom 23 to penetrate the ground first when the implement is lowered to its operating position and thus clear surface trash away from the path of fertilizer assembly 28. In order to overcome the bias of spring 43 and force the earthworking tool 29 into the ground behind the lister bottom, an elongated generally rectangularly shaped movable member in the form of a gauge shoe 45 is provided and pivotally connected at its forward end to plates 24 to accommodate vertical swinging movement thereof.

Member 45 engages the ground as the implement is lowered to its operating position, as indicated in FIGURE 1, and as the lister bottom begins to penetrate the ground, member 45 pivots upwardly and this motion is transmitted through a pitman in the form of a thrust link 46 to a pin 47 carried at the end of an extension arm 48 affixed to and projecting forwardly from lower link 36. Upward movement of gauge shoe 45 is thus transmitted through the lever extension 48 to force fertilizer assembly 28 downwardly against the action of spring 43 to cause it to penetrate the ground and reach the level below lister bottom 23 indicated in FIGURE 3.

It is believed that the construction and operation of the novel earthworking apparatus of this invention will be clearly understood from the foregoing description. It should likewise be understood that the invention has been described in its preferred embodiment only, and that modifictaions may be made therein without departing from the spirit of the invention or the scope of the appended claims.

What is claimed is:

1. In an implement, a supporting frame adapted to be vertically moved between operating and transport positions, an earthworking tool carried by the frame and connected therewith for vertical movement with respect thereto, means in the connection of said tool with the frame biasing said tool upwardly relative to the frame, a ground engaging member operatively connected to said frame for vertical movement with respect thereto and engageable with the ground upon lowering the implement, prior to engagement thereof by said tool, and linkage operatively connecting said member and said tool for urging the latter downwardly in response to engagement of said member with the ground.

2. The invention set forth in claim 1, wherein the connection of said tool to said frame includes link means pivotally connected at one end to said tool and at the other end to said frame and said biasing means is a spring operatively connected at one end to the frame and at the other end to the tool to swing the latter upwardly relative to the frame.

3. The invention set forth in claim 2, wherein a lever is secured to said linkage and a thrust link connects said lever to said member to swing said linkage and said tool downwardly in response to engagement of said member with the ground when the implement is lowered.

4. The invention set forth in claim 3, wherein another earthworking tool is carried by said frame in advance of said first mentioned tool and said member is a ground-engaging shoe pivoted at one end on said other earthworking tool.

5. In an implement, a supporting frame adapted to be vertically moved between operating and transport positions, a first earthworking tool carried by said frame to be raised therewith and lowered to a ground-engaging operating position, a second earthworking tool mounted on the frame and connected thereto for vertical movement with respect to said first tool, means in the connection of said second tool to the frame biasing said second tool upwardly relative to said first tool, a ground-engaging member operatively connected to the frame and engageable with the ground upon lowering the implement, and means connecting said member to said second tool and responsive to engagement of said member with the ground for overcoming the bias of said biasing means and urging said second tool into the ground.

6. The invention set forth in claim 5, wherein the connection of said second tool to said frame includes generally parallel links accommodating movement of said second tool relative to said first in a generally straight line.

7. The invention set forth in claim 6, wherein said first tool is disposed in advance of said second tool and engages the ground prior to engagement thereof by said second tool.

8. The invention set forth in claim 7, wherein said member is a ground-engaging shoe having one end engageable with the ground and linkage operatively connects the free end of said shoe to said generally parallel links to move said second tool downwardly.

No references cited.

ABRAHAM G. STONE, *Primary Examiner.*

A. E. KOPECKI, *Assistant Examiner.*